US005559765A

United States Patent [19]
Andou

[11] Patent Number: 5,559,765
[45] Date of Patent: Sep. 24, 1996

[54] DISK DRIVE ACCESS CONTROLLER

[75] Inventor: Katsumi Andou, Kasugai, Japan

[73] Assignees: Fujitsu Limited; Fujitsu VLSI Limited, both of Japan

[21] Appl. No.: 406,152

[22] Filed: Mar. 17, 1995

[30] Foreign Application Priority Data

Mar. 18, 1994 [JP] Japan .................................. 6-049272

[51] Int. Cl.$^6$ .................................................. G11B 7/007
[52] U.S. Cl. ............................... 369/32; 369/47; 369/48; 369/54
[58] Field of Search ................................. 369/32, 47, 48, 369/54, 58

[56] References Cited

U.S. PATENT DOCUMENTS

5,182,740  1/1993  Mizokami et al. ....................... 369/47
5,446,724  8/1995  Tabe et al. ................................. 369/48

Primary Examiner—David C. Nelms
Assistant Examiner—Vu A. Le
Attorney, Agent, or Firm—Greer, Burns & Crain, Ltd

[57] ABSTRACT

A data access controller for a disc device is disclosed for accessing data on a disc. A control unit, controlling the disc device, outputs a mode switching signal. A mark detector detects the sector mark and the address mark in read data from a target sector, and outputs a first and second detection signals indicative of the detections of the sector mark and address mark, respectively. In response to the mode switching signal, the mark detector enters a first search mode to detect all data bits of the target sector. A physical address read circuit reads physical address data in the read data in response to the second detection signal, and outputs a synchronizing signal. The format counter receives a basic clock signal to count the number of pulses of the clock signal, and resets its count value to a prescribed value in accordance with the first detection signal and the synchronizing signal to synchronize its count value with the position of the drive head on the target sector. A data processing circuit reads user data in the read data, referring to the count value from the format counter.

17 Claims, 9 Drawing Sheets

DISK DRIVE ACCESS CONTROLLER

BACKGROUND OF THE INVENTION

1. Field of the Invention

The present invention relates generally to a disk drive controller, and in particular to an apparatus and method for accessing data on a computer disk storage medium by a disk drive controller, in order to reduce the load and processing requirements of a processor responsible for controlling the disk drive controller.

2. Description of the Related Art

One of the more significant advances seen in digital data recording mediums is the remarkable increase in the recording densities available with conventional computer disks. Improvements along these lines have occasioned a noticeable shift from the use of magnetic recording mediums to that of optical disks. In great part this is due to the increased density with which optical disks store digital data.

Various formats used to facilitate optical disk data storage and access have been proposed to even further increase the recording density of optical storage mediums. One such format utilizes a zone constant angular velocity (ZCAV) system. Devices currently available that utilize ZCAV formatted data, however, require increased precision and control in their read/write operations and a higher speed in their read operations than do data access devices designed for conventionally formatted data.

Figure 1:
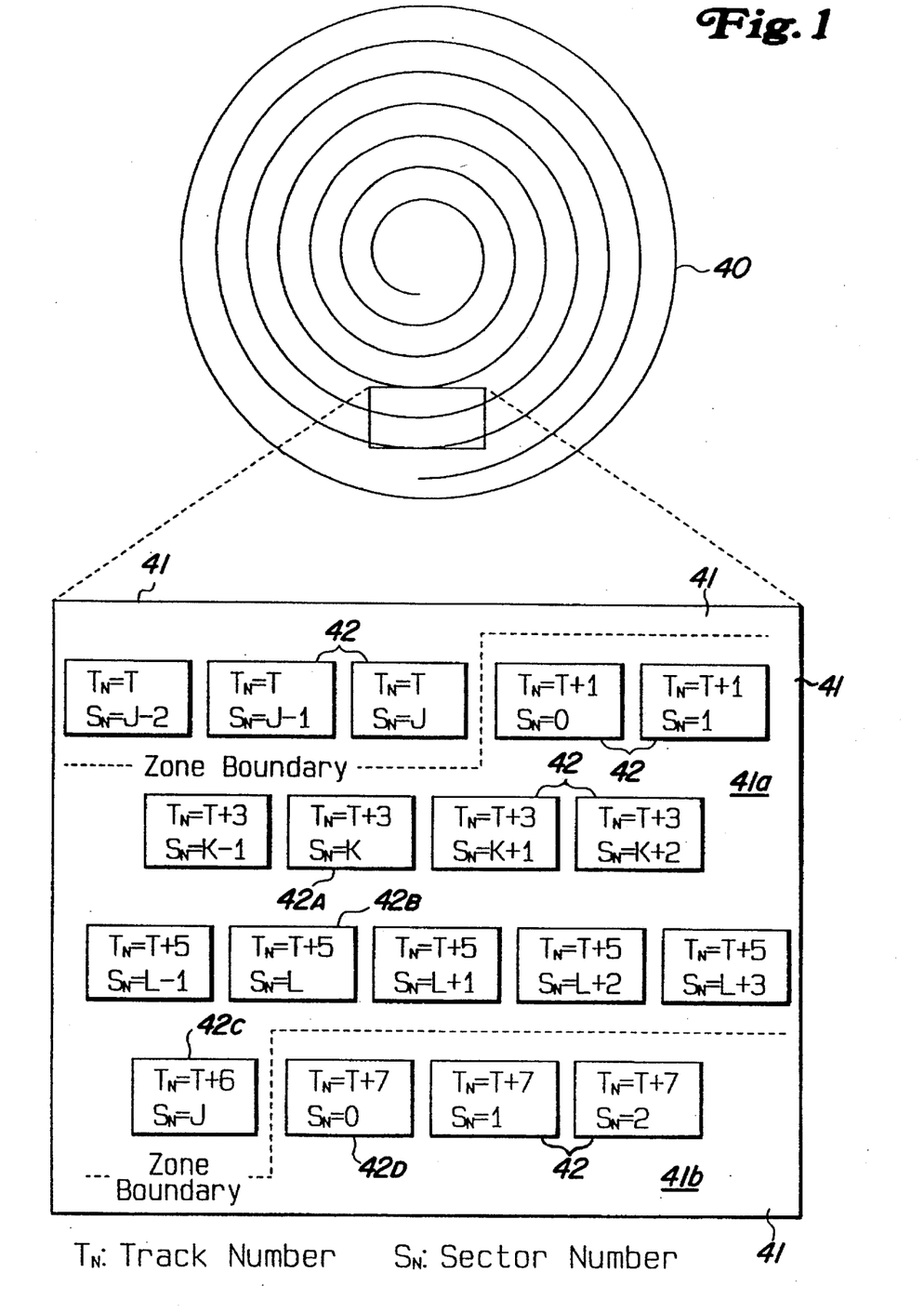
FIG. 1 is a schematic diagram showing an optical disc of ZCAV formatting system.

The format of the ZCAV system for a disk such as that shown in FIG. 1 has the following characteristics:

(I) Data recording density increases from one zone 41 to the next, as the zones progress toward the peripheral portion of the disk. A zone 41 is an area of the disk that has the same recording density. The increase in recording density is characteristically stepwise rather than linear.

(II) The heads of respective sectors 42 are randomly arranged rather than aligned together in a radial direction. The length of the sectors 42 varies from zone to zone, as for example, from zone 41a to zone 41b. The length of the sectors 42 in each zone is however constant.

Figure 2:
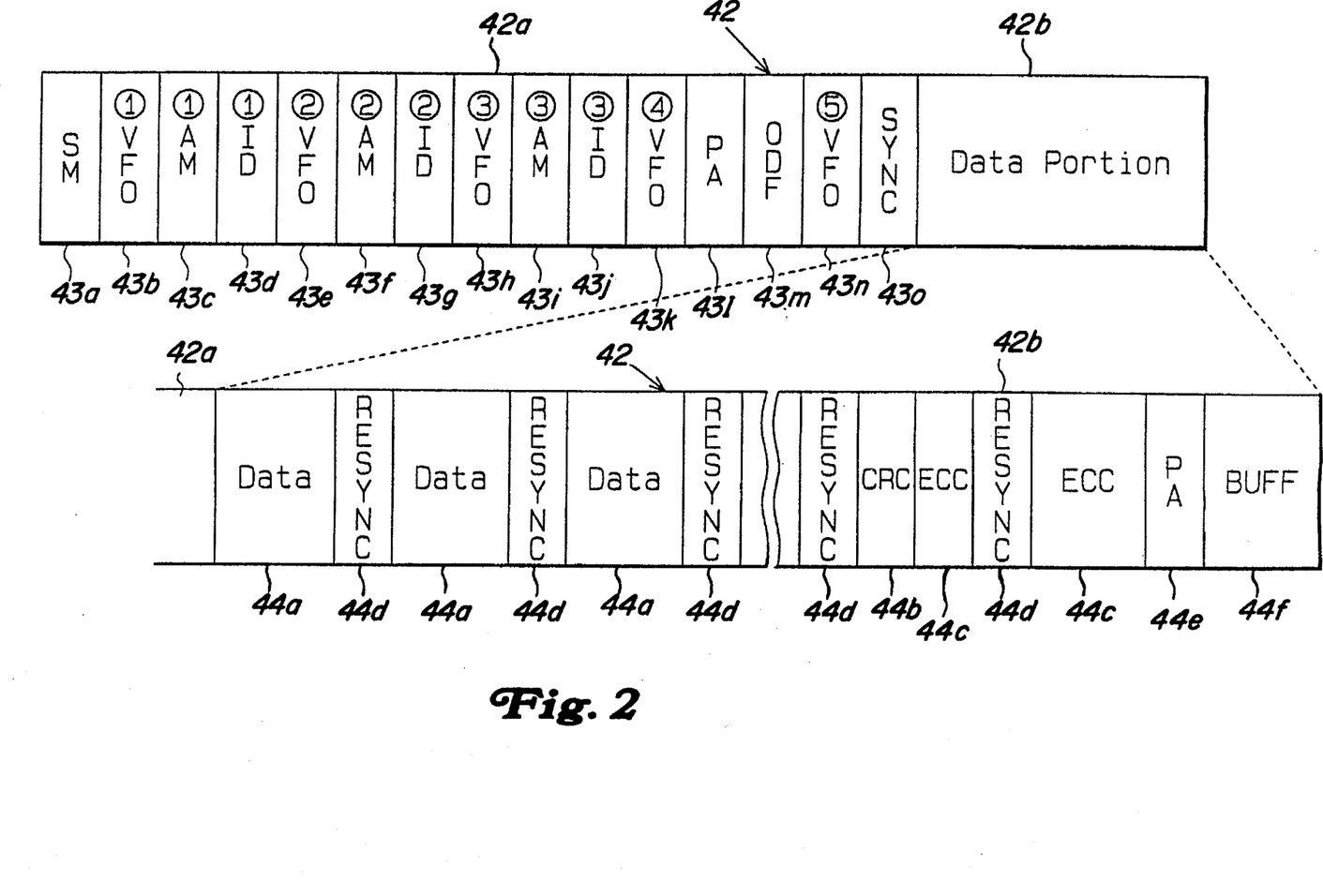
FIG. 2 is a diagram showing sector format.

FIG. 2 schematically shows a recording format of each sector 42. Each sector is divided into an ID portion 42a and a data portion 42b.

The ID portion 42a includes a sector mark portion or area (SM) 43a, a first lock-up pattern portion (first VFO) 43b, a first address mark portion (first AM) 43c, a first physical address (first ID) 43d, a second lock-up pattern portion (second VFO) 43e, a second address mark portion (second AM) 43f, a second physical address (second ID) 43g, a third lock-up pattern portion (third VFO) 43h, a third address mark portion (third AM) 43i, a third physical address (third ID) 43j, a fourth lock-up pattern portion (fourth VFO) 43k, a post ample portion (PA) 43l, an optical-system offset portion (ODF) 43m, a fifth lock-up pattern portion (fifth VFO) 43n, and a synchronizing pattern portion (SYNC) 43o.

The data portion 42b includes a plurality of user data portions 44a, a cyclic redundancy code portion (CRC) 44b, error correction code portions (ECC) 44c, resynchronizing pattern portions (RESYNC) 44d, a post ample portion (PA) 44e, and a buffer portion (BUFF) 44f. Each resynchronizing pattern portion (RESYNC) 44d is interposed among the respective user data portions 44a, the CRC portion 44b and the ECC portions 44c.

For optical disc devices using an optical disc 40 conforming to the recording format shown in FIGS. 1 and 2, data read/write operations are carried out while varying the rotational speed (angular velocity) of the optical disc 40 in accordance with the speed assigned to particular zone being searched. For example, access to the individual sectors 42 in the zone 41 is carried out at an angular velocity particular to the zone in which the sectors are located. Consequently, the angular velocity with which the optic rotates during data access varies from zone to zone.

Data read operations from one sector 42 are carried out as follows. The optical disc device first manipulates the drive head to read data from a sector. Specifically, the drive head detects a sector mark recorded on the SM 43a in the ID portion 42a for a particular collection of read data. The drive head also detects each address mark recorded on the first to third AMs 43c, 43f and 43i. Next, the optical disc device reads the respective physical addresses of the first to third IDs 43d, 43g and 43j in order to perform an error check on the read value with CRC. After the error check, the disk device determines whether to read the data recorded in the data portion 42b. The disk device next determines whether the read sector is a target sector by referring to the physical address. If a particular sector is determined to be the desired target sector, data reading operations proceed.

In order to read data recorded in the target data portion 42b, the synchronizing pattern of the SYNC 43o is first detected. Thereafter, individual pieces of data are read from the user data portion 44a at the head of the data portion 42b. The data in the residual respective user data portions 44a, CRCs 44b and ECCs 44 are read while referring to the resynchronizing patterns of the respective RESYNCs 44d.

When data is to be written in the user data portion 42b, a pattern which synchronizes the write data is written in the fifth VFO 43n. Likewise a synchronizing pattern indicative of the beginning of a data series is written into the SYNC 43o. Subsequently, data are written in each of the user data portions 44a, and a resynchronizing pattern indicative of the start of a data segment is written into each RESYNC 44d. A cyclic redundancy code is then written into the CRC portion 44b, and an error correction code is written into the ECC portion 44c.

Detection of the various patterns described above as well as data read/write operations are carried out by a detection circuit, a read circuit and a write circuit installed in the format controller of the disc drive device. The format controller is equipped with a format counter (FMC) that counts the number of pulses of a system clock signal from a frequency synthesizer. The detection circuit, the read circuit and the write circuit are controlled based on the count value determined by the format counter (FMC). The count value of the FMC corresponds to the number of bytes in one sector and is used to determine the timing of individual circuits installed in the format controller. The period of time for accessing data in each sector is called a "detection window".

In the individual circuits of the format controller, the data read/write operations undertaken for the first to third address marks 43c, 43f and 43i, SYNC 43o, RESYNC 44d, the first to third IDs 43d, 43g and 43j and user data portions 44a in a sector 42 are carried out in synchronism with the timing signals produced by the read clocks. These timing signals are generated based on the data recorded in the first to fifth VFOs 43b, 43e, 43h, 43k and 43n of sector 42.

The read clock timing signals and the system clock for the FMC are asynchronous with each other, in as much as they operate at different frequencies. This allows the count value of the FMC to be corrected every time the circuits of the format controller perform a read operation of the first to the third AMs 43c, 43f and 43i, SYNC 43o, RESYNC 44d and from the first to third IDs 43d, 43g and 43j. Lack of compliance between the count value of the FMC and the position of the drive head in a sector, caused by slippage (i.e., a lag in timing) between the read clock and the system clock, can in this way be corrected.

Occasionally, however, the individual circuits of the format controller cannot detect a mark within the circuit's operational timing period due to a pattern abnormality in the sector 42. As a result, reading or detecting the physical address cannot be completed within a prescribed period of time. When this happens, failures in mark detection and in physical address reading operations are determined. Likewise, detection of the adjacent sector 42 and read operations for that adjacent sector are carried out. If address detection and read operations are successfully preformed at an adjacent sector, the count value of the FMC is resynchronized. With this operation, the count value of the FMC is synchronized for the position of the drive head despite the occurrence of a time lag occurring between the system and read clocks.

Conventional optical disc devices, compliant with ZCAV system formatting, have the following disadvantages when performing data read operations.

As shown in FIG. 1, the heads of individual sectors belonging to a zone 41 are not arranged on a radial line extending from the center of the disc. Consequently, when a drive head seeks from a sector 42A (track number T+3; sector number K) to a sector 42B (track number T+5; sector number L) in the zone 41a, for example, slippage frequently occurs between the position of the drive head at the sector 42B and the count value of the FMC. The maximum value of the slippage corresponds to the length of one sector.

This slippage induces a time lag in the operational timing (i.e., the detection window) of the individual circuits in the format controller. Due to the time lag, the detection of each mark in a particular sector (in this case, the sector 42B of the sector number L) and reading of the physical addresses of the first to third IDs 43d, 43g and 43j cannot be performed. As a result, for sectors subsequent to Sector 42B, the mark and physical address cannot be read. This in turn breaks the synchronization between the FMC and the other internal circuits of the format controller, causing the current position of the drive head to become unidentified.

The same disadvantage occurs when plural sectors are continuously accessed over adjacent zones, for example, when the drive head is shifted from a sector 42C (track T+6; sector number J) in the zone 41a to a sector 42D (track T+7; sector number 0) in an adjacent zone 41b.

The FMC counts the number of pulses of the system clock signal from the frequency synthesizer. For every occurrence of a zone change, the frequency of the system clock signal changes to the frequency appropriate to the new zone. The frequency synthesizer generating the system clock signal needs time to change and lock the signal from its current frequency to that of a new frequency. Therefore, when the drive head shifts from a first zone 41a to a second zone 41b, the FMC carries out its count operation using the system clock signal set at the previous frequency until the system clock signal locks onto the new frequency. When this happens, the FMC carries out its count operation with the system clock set at a frequency appropriate to the new zone 41b.

In this operation, even though the timing for reading sector mark data 43a is synchronized to that of the sector head, the position of the drive head and the count value of the FMC will not coincide when the drive head passes over the sector 42. This prevents mark detection at the target sector during the physical address seek and read operations for the first to third IDs 43d, 43g and 43j. Consequently, the marks and physical addresses of all the sectors 42 subsequently sought by the drive head cannot be read. As a result, the synchronization between the FMC and the other internal circuits is lost and the target sought by the drive head remains unspecified.

In order to recognize an unspecified target for the drive head, the operation of the format controller must be temporarily stopped to resynchronize the count value of the FMC and the position of the drive head. Resynchronization control is carried out by the microprocessing unit (MPU) responsible for controlling the optical disc device. The above described resynchronization operations, as a result, increase the load of the MPU, and induce a drive delay know as "kick back". This delay degrades the performance of the optical disc device.

The same problem occurs even when, in order to access the sector 42D (track T+7; sector number 0) in the zone 41b, the frequency of the basic clock signal is locked to the frequency for the zone 41b before the drive head passes over the sector 42C (track T+6; sector number J) in the zone 41a.

Even though timing operations to read the sector mark 43b at the head of the sector 42C (sector number J) can be synchronized, slippage occurring between the drive head position and the FMC count value during the time the drive head passes over the sector 42C, prevents the drive head from reading the physical addresses of the first to third IDs 43d, 43g and 43j, etc. of the sector 42C. As a result, the disk device cannot read the sector mark 43a of sector 42D (sector number 0) in the subsequent zone 41b. The disk device, likewise, cannot read the contents of the first to third IDs 43d, 43g and 43j. This not only prevents a new sector from being accessed, but also prevents all subsequent marks and physical addresses in sector 42 from being read. Data, therefore, cannot be read out from the data portion 42b of each sector.

The inability of the disk device to carry out read operations in sectors arranged at the head area of each zone 41 increases the load of the MPU. In view of the foregoing, some formatting systems do not utilize the sectors arranged at the head area of each zone 41. This approach, however, reduces the amount of data to be recorded on the recording medium, and degrades the performance of the optical disc device.

SUMMARY OF THE INVENTION

Accordingly, it is a primary object of the present invention to provide a format controller for a disk drive device that accesses data on a computer disk storage medium by resynchronizing the count value of a format counter without imposing an excessive load on a control circuit of the disc device even when synchronization between a drive head and the format counter is lost.

It is a further object of the present invention to provide a method of data access control using the format controller. According to this method, all sectors of a recording medium of ZCAV format are efficiently used.

To achieve the foregoing and other objects and in accordance with the purpose of the present invention, an improved data access controller is provided.

Figure 3:
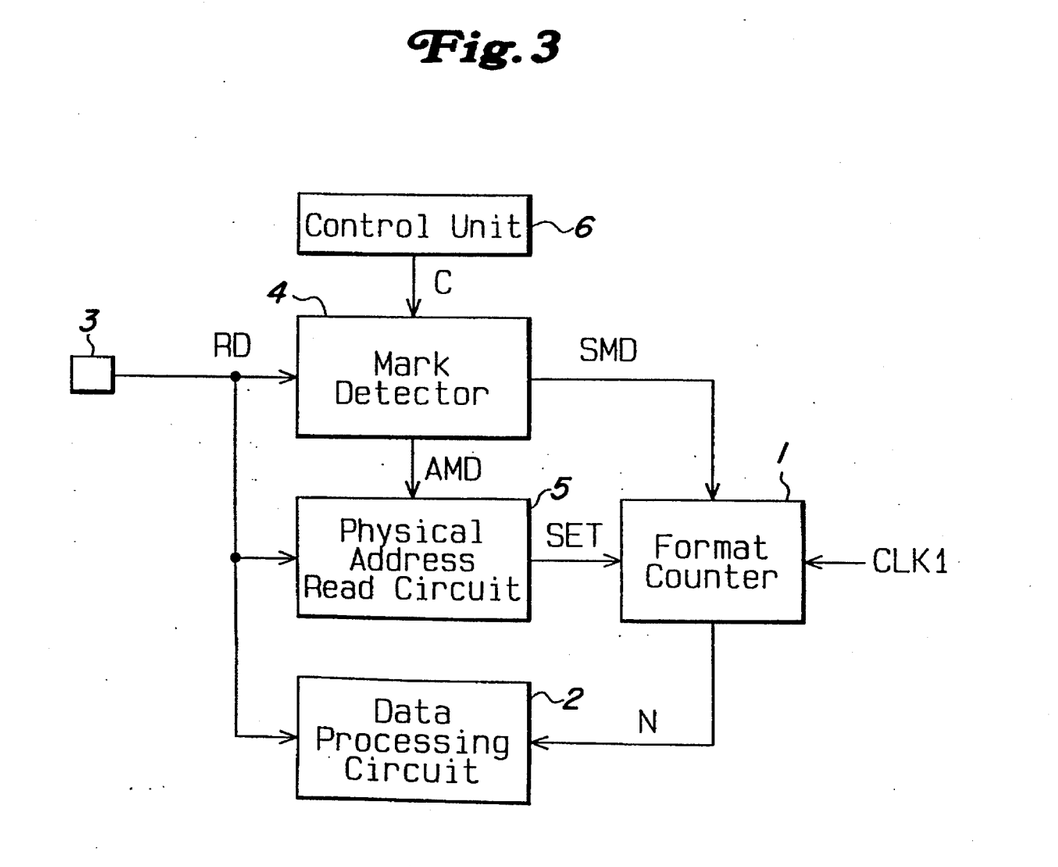
FIG. 3 is a block diagram showing essential elements of the present invention.

As shown in FIG. 3, the data access controller according to the present invention includes a format counter 1, a data processing circuit 2, a mark detector 4, a physical address read circuit 5 and a control unit 6. The control unit 6 controls the whole system of a disc device, and outputs a control signal, C, such as a mode switching signal. The mark detector 4 detects a sector mark and address mark in read data, RD, from a target sector by a drive head 3 of the disc device, and outputs a first detection signal, SMD, indicating detection of sector mark and a second detection signal, AMD, indicating detection of address mark. The mark detector 4 enters a first search mode, in which all data bits of the target sector are detected, in response to the mode switching signal C from the control unit 6. The physical address read circuit 5 reads physical address data in the read data RD in response to the second detection signal AMD, and outputs a synchronizing signal, SET. The format counter 1 receives a basic clock signal, CLK1, to count the number of pulses of the clock signal and outputs the count value, N. The format counter 1 resets the count value to a prescribed value in accordance with the first detection signal SMD and the synchronizing signal SET in order to synchronize the count value with the position of the drive head 3 over the target sector. The data processing circuit reads user data in the read data RD, referring to the count value N from the format counter 1.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings.

FIGS. 4 to 7 show a first embodiment according to the present invention, in which:

DETAILED DESCRIPTION OF THE PREFERRED EMBODIMENTS

First Embodiment

Figure 4:
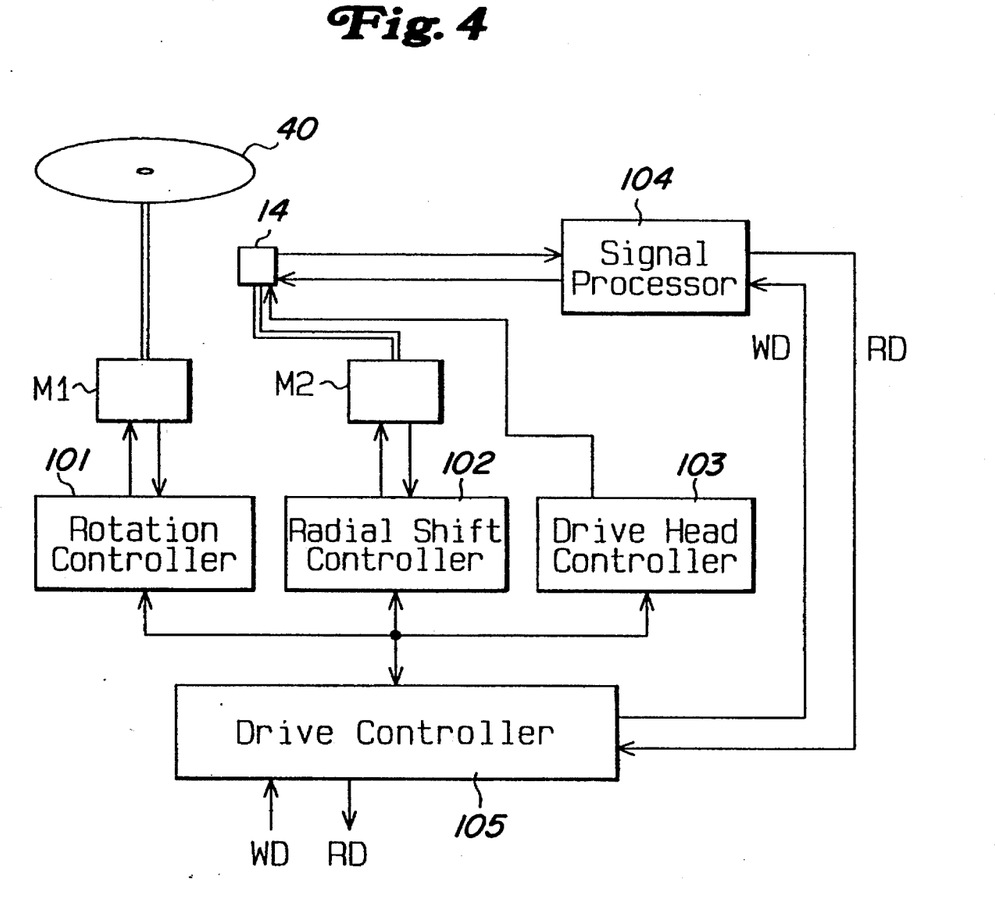
FIG. 4 is a block diagram showing the schematic construction of an optical disc device.

An optical disc device according to a first embodiment of the present invention will be described with reference to FIGS. 4 to 7. FIG. 4 shows the construction of an optical disc device for reading and writing data from and into an optical disc serving as a recording medium. The optical disc, used in the optical disc device, is substantially identical to the disc as shown in FIGS. 1 and 2, and the same reference numeral is affixed thereto.

The optical disc 40 is rotated by a motor M1, which is controlled by a rotation controller 101. A drive head 14 is driven by a motor M2 to shift in a radial direction over the optical disc 40. The motor M2 is controlled by a radial shift controller 102. The drive head 14 is formed by an optical pick-up for reading data recorded on the optical disc 40 and writing data onto the optical disc 40. A drive head controller 103 controls the drive head 14 performing data recording and reproduction for the optical disc 40. The level of a signal picked up by the drive head 14 is corrected by a signal processor 104. The corrected signal is output as read data RD from the signal processor 104. The signal processor 104 corrects the signal level of write data WD from a drive controller 105, and supplies the drive head 14 with the corrected signal.

The drive controller 105 inputs read data RD from the signal processor 104 to obtain information from the read data RD. The drive controller 105 outputs the write data WD, to be recorded in a desired sector 42, to the signal processor 104. Further, the drive controller 105 allows the drive head 14 to seek a position of the track that a target sector belongs to, and outputs to the controllers 101 to 103 various kinds of drive control signals for setting the number of revolution of an optical disc 40 to a preset revolution number according to a zone to be sought.

Figure 5:
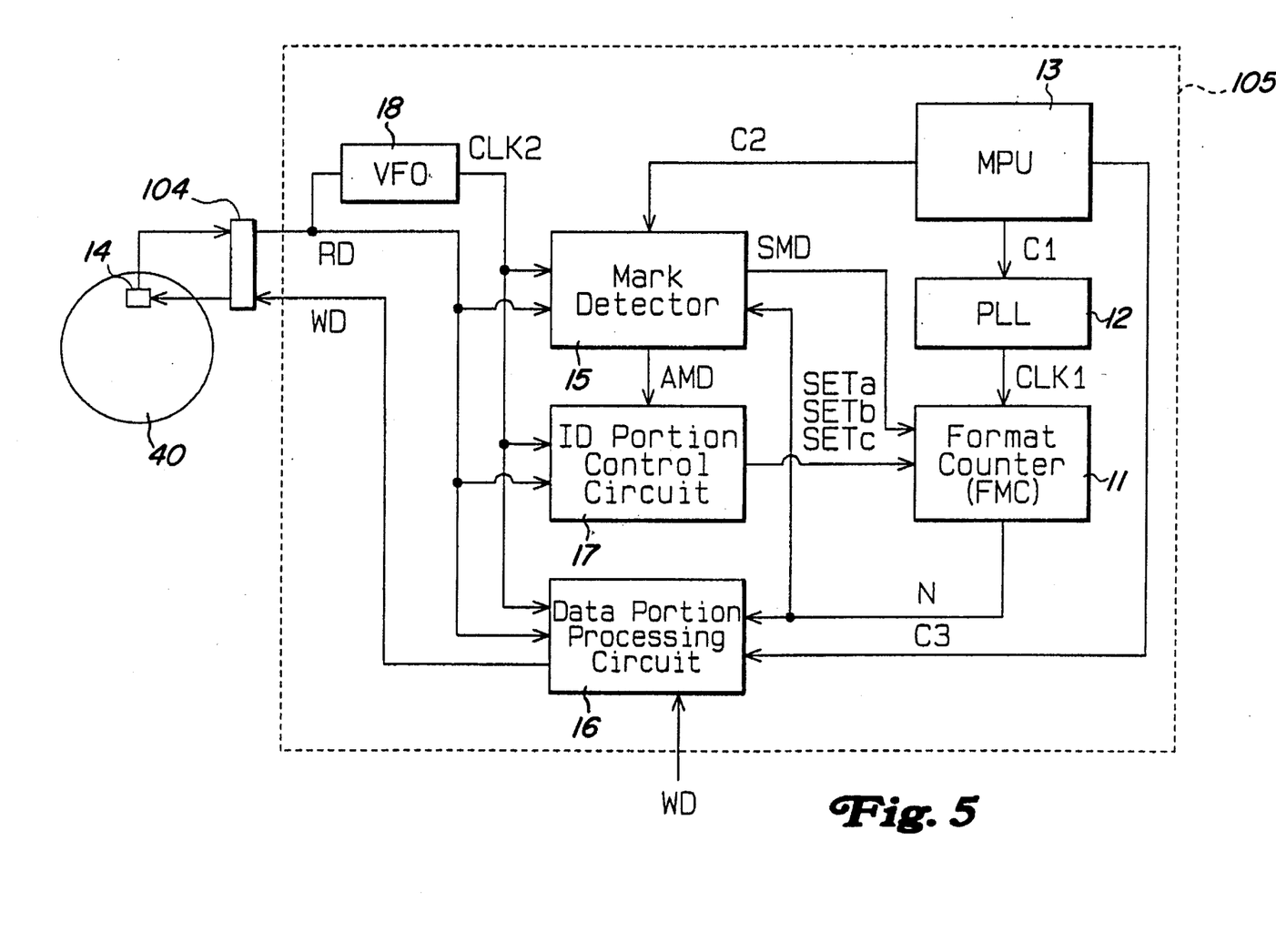
FIG. 5 is a circuit diagram showing a format controller.

FIG. 5 shows a format controller provided in the drive controller 105. A microprocessing unit (MPU) 13, serving as a control circuit for controlling the whole optical disc device, is commonly used by the controllers 101, 102, 103 and 105. A format counter (hereinafter referred to as FMC) 11 is supplied with a basic clock signal CLK1 from a Phase Locked Loop (PLL) frequency synthesizer (hereinafter simply referred to as PLL synthesizer) 12, and counts the number of pulses of the clock signal CLK1. The PLL synthesizer 12 receives a control signal C1 from the MPU 13. The control signal C1 generated by the MPU 13 is a instruction signal for causing the PLL synthesizer 12 to output the basic clock signal CLK1 having the frequency in accordance with a zone 41 on the disc sought by the drive head 14. In response to the control signal C1, the PLL synthesizer 12 outputs a basic clock signal CLK1 having a predetermined frequency matching the zone 41.

The FMC 11 counts the number of pulses of the basic clock signal CLK1, and outputs its count value, N, to a mark detector 15 and a data portion processing circuit 16. The count value N is correlated to the data bit number of one sector 42 which is read out by the drive head 14. Therefore, if the count value N is coincident with the total data bit number of one sector, the FMC 11 initializes the count value N (i.e., set it to zero) to start its counting operation again. The FMC 11 is supplied with a mark detection signal (hereinafter referred to as SM signal) from the mark detector 15, and is also supplied with three kinds of synchronizing signals SETa, SETb and SETc from an ID portion control circuit 17. In response to the SM signal SMD, the FMC 11 sets the count value N to a value N1 which is in synchronism with a pass bit or the present position of the drive head at the sector 42. Likewise, in response to the synchronizing signals SETa, SETb and SETc, the FMC 11 sets the count value N to values N2a, N2b and N2c which are in synchronism with the position of the drive head 14, respectively. When the count value N is set to any one of the values N1, N2a, N2b and N2c, the FMC 11 starts its counting operation from the set value.

The mark detector 15 receives a search mode signal C2 from the MPU 13. Upon input of the search mode signal C2, the operation mode of the mark detector 15 is set to a first search mode (ordinary search mode) in which a mark detection operation is carried out at all times during the operation of the format controller. On the other hand, when no search mode signal C2 is input, the operation mode of the mark detector 15 is set to a second search mode (extraordinary search mode) in which the detection operation is carried out only during a predetermined period of time.

In the first search mode, irrespective of the count value N of the FMC 11, the mark detector 15 receives all read data RD, which the drive head 14 can read out from the sectors of the optical disc 40, in synchronism with a read clock signal CLK2 from a variable frequency oscillator (hereinafter referred to as VFO) 18.

In the second search mode, the mark detector 15 is actuated only when the count value N of the FMC 11 is between a value Na and a value Nb (i.e., Na≦N≦Nb). As a result, the mark detector 15 receives a part of the read data RD from one sector in synchronism with the read clock CLK2, only during the operation timing defined as a limited period of time (called "detection window"). The values Na and Nb correspond to the positions of the SM 43a and the third AM 43i in a sector. Therefore, as long as the count value N of the FMC 11 and the position of the drive head 14 are synchronized with each other, the sector mark of the SM 43a and each address mark of the first to third AMs 43c, 43f and 43i are surely detected by the mark detector 15 in the range of these values (Na≦N≦Nb).

Accordingly, the mark detector 15 detects the sector mark and the address mark at all times in the first search mode. In the second search mode, the mark detector 15 is actuated during only a predetermined time period (i.e., detection window) to detect the sector mark and the address mark.

The mark detector 15 determines whether input data is a sector mark of the SM 43a. When the data is the sector mark of the SM 43a, the mark detector 15 outputs the SM detection signal SMD to the FMC 11. In addition, the mark detector 15 judges whether the input data are the address marks of the first to third AMs 43c, 43f and 43i. When the input data are the address marks of the first to third AMs 43c, 43f and 43i, the mark detector 15 outputs an address detection signal (hereinafter referred to as AM detection signal) AMD to the ID portion control circuit 17.

The ID portion control circuit 17 enters an operation mode for only a predetermined time period from the input of the AM detection signal AMD. In the operation mode, the ID portion control circuit 17 is supplied with the subsequent read data RD (i.e., physical addresses of the respective IDs 43d, 43g and 43j), in synchronism with the read clock signal CLK2. The ID portion control circuit 17 judges whether the input data are physical addresses of the IDs 43d, 43g, 43j. When the input data are the physical addresses of the respective IDs 43d, 43g and 43j, the ID portion control circuit 17 judges that data reading is successful, and outputs the synchronizing signals SETa, SETb and SETc to the FMC 11.

The data portion processing circuit 16 receives the count value N from the FMC 11, and is actuated only when the count value N of the FMC 11 is between a value Ni and a value Nj (i.e., Ni≦N≦Nj). As a result, the data portion processing circuit 16 receives a part of the read data RD, which the drive head 14 reads out from the sectors of the optical disc 40, in synchronism with the read clock signal CLK2, only during the operation timing (detection window) defined as a limited period of time. The values Ni and Nj correspond to the head and the trail of the data portion 42b of a sector 42, respectively. Therefore, as long as the count value N of the FMC 11 and the position of the drive head 14 are synchronized with each other, data recorded in the respective portions 44a to 44f of each data portion 42b can be read out by the data portion processing circuit 16 in the range of these values (Ni≦N≦Nj).

In response to a write mode signal C3 from the MPU 13, the data portion processing circuit 16 enters a write mode. In the write mode, the data portion processing circuit 16 outputs write data WD to the drive head 14 when the count value N of the FMC 11 satisfies the following inequality: Ni≦N≦Nj.

The VFO 18 is supplied with read data RD from the drive head 14. The VFO 18 reads the patterns of the first to fifth VFOs 43b, 43e, 43h, 43k and 43n, and outputs the read clock signal CLK2 having the frequency set in accordance with an individual pattern.

In the optical disc device, the output of the search mode signal C2 from the MPU 13 causes the mark detector 15 to be set to the first search mode. At this time, the PLL synthesizer 12 outputs a basic clock signal CLK1, having the frequency corresponding to the zone 41 sought by the drive head 14, to the FMC 11. The FMC 11 counts the number of pulses of the basic clock signal CLK1, and outputs the count value N to the data portion processing circuit 16.

In synchronism with the read clock signal CLK2, the mark detector 15 in the first search mode takes in all the read data successively read out from the sectors by the drive head 14. The mark detector 15 detects the sector mark of the SM 43a and the address marks of the first to third AMs 43c, 43f, 43i from the read data RD. Immediately when detecting the sector mark of the SM 43a of one sector 42, the mark detector 15 outputs an SM detection signal to the FMC 11. In response to the SM detection signal SMD, the FMC 11 sets the count value N to a predetermined value N1 to start its counting operation from the count value N1. In other words, at this time, the FMC 11 is forcedly reset to be synchronized with the position of the drive head 14.

Subsequently, when the mark detection circuit 15 detects the address mark of the first AM 43c of the sector 42, the mark detector 15 immediately outputs an AM detection signal AMD to the ID portion control circuit 17. In response to the AM detection signal AMD, the ID portion control circuit 17 is set to an operation mode for a predetermined period of time, and receives subsequent data, i.e., physical address of the first ID 43d, in synchronism with the read clock signal CLK2. As soon as the reading of the physical address is completed, the ID portion control circuit 17 outputs a first synchronizing signal SETa to the FMC 11. In response to the synchronizing signal SETa, the FMC 11 sets its count value to a predetermined value N2a, and starts its count operation from the set value N2a. Thus, the count value of the FMC 11 is forcedly synchronized with the position of the drive head 14.

Subsequently, when the mark detector 15 detects the address mark of the second AM 43f of its sector, the mark detector 15 immediately outputs an AM detection signal AMD to the ID portion control circuit 17 in the same manner as described above. In response to the AM detection signal AMD, the ID portion control circuit 17 enters the operation mode for a predetermined period of time again to read the subsequent data, i.e., physical address of the second ID 43g, in synchronism with the read clock signal CLK2. When the reading of the physical address is successfully completed, the ID portion control circuit 17 immediately outputs a second synchronizing signal SETb to the FMC 11. In response to the synchronizing signal SETb, the FMC 11 sets its count value N to a value N2b to start its counting operation from the set value N2b. Thus, the count value of the FMC 11 is forcedly synchronized with the position of the drive head 14, again.

Subsequently, when the mark detector 15 detects the address mark of the third AM 43i of its sector 42, the mark detector 15 immediately outputs an AM detection signal AMD to the ID portion control circuit 17 in the same manner as described above. In response to the AM detection signal AMD, the ID portion control circuit 17 enters the operation mode for a predetermined period of time again to read the subsequent data, i.e., physical address of the third ID 43j in synchronism with the read clock signal CLK2. When the reading of the physical address is successfully completed, the ID portion control circuit 17 immediately outputs a third synchronizing signal SETc to the FMC 11. In response to the synchronizing signal SETc, the FMC 11 sets its count value N to a value N2c to start its count operation from the set value N2c. Thus, the count value of the FMC 11 is forcedly synchronized with the position of the drive head 14, again. As described above, the FMC 11 is forcibly synchronized with the drive head 14 by the mark detector 15 and the ID portion control circuit 17 every time sector mark and physical address are read out.

When the count value N of the synchronized FMC 11 reaches a value Ni, the data portion processing circuit 16 enters an operation mode. Then, the data portion processing circuit 16 receives the subsequent data, i.e., each data of the data portion 42b, in synchronism with the read clock signal CLK2. Thus, the data portion processing circuit 16 enters the operation mode based on the count value of the synchronized FMC 11, so that each data of the data portion 42b can be surely read out.

Next, a seek operation of the drive head 14 from the sector 42A (track T+3; sector number K) to the sector 42B (track T+5; sector number L) in the middle zone 41a shown in FIG. 1 will be described.

Figure 6:
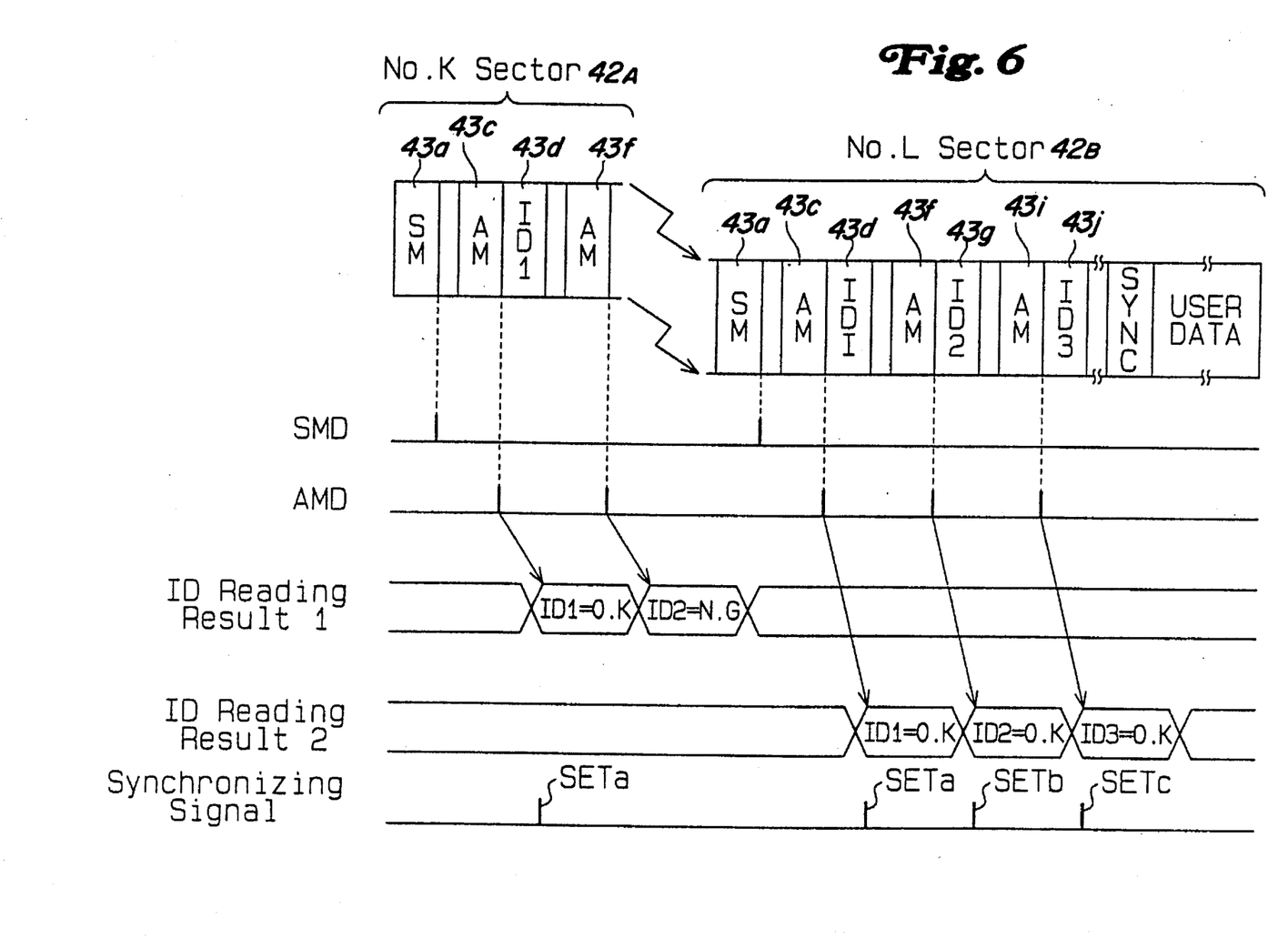
FIG. 6 is a timing chart showing the relationship between SM and AM detection signals and a synchronizing signal during seek operation.
Figure 7:
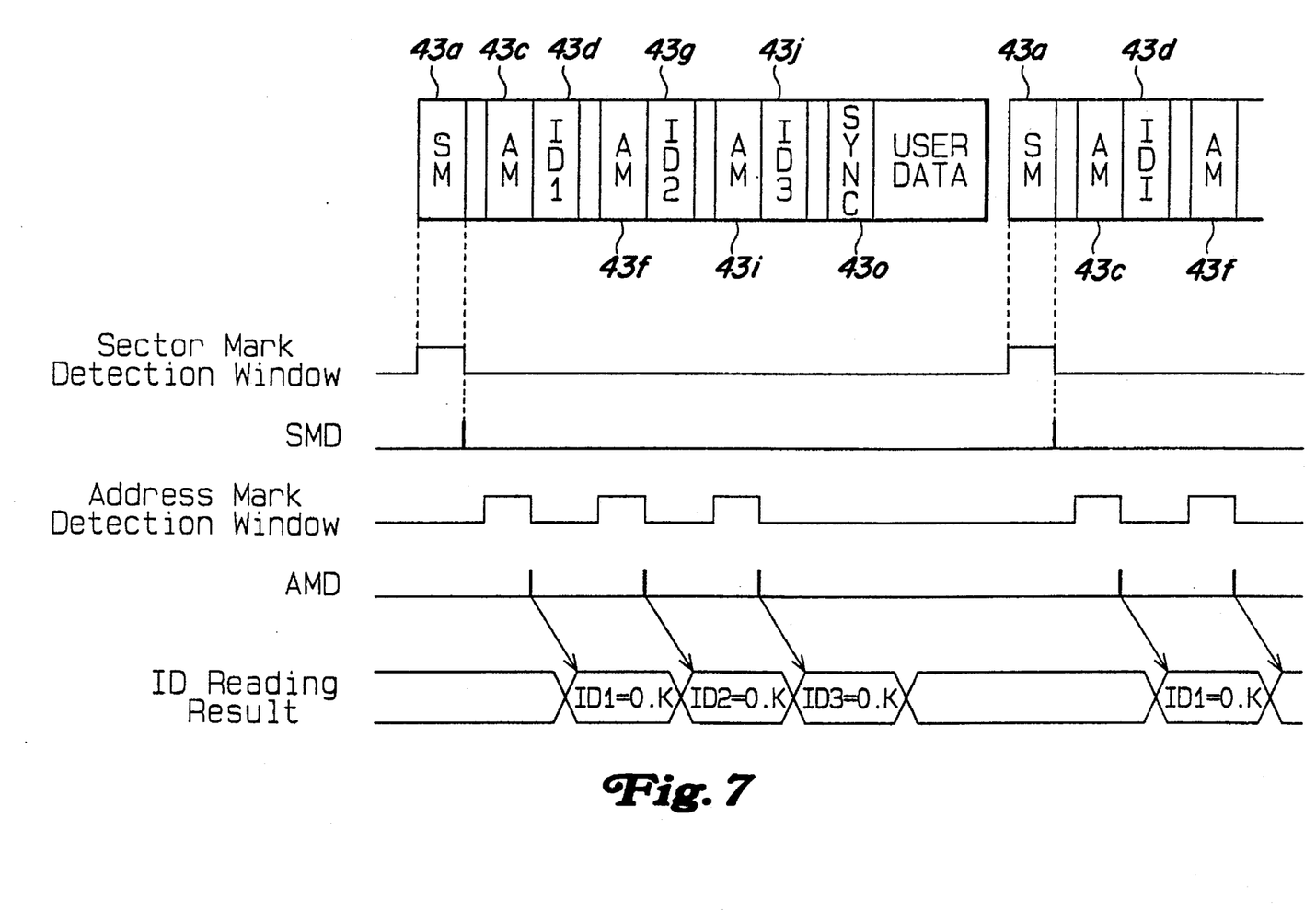
FIG. 7 is a timing chart showing the relationship between SM and AM detection signals and a synchronizing signal in a first search mode.

As shown in FIG. 6, it is possible that the mark detector 15 cannot detect the second ID 43g in the sector 42A during a seek operation of the drive head 14. Since the mark detector 15 is in the first search mode at that time, the mark detector 15 will be able to detect the sector mark of the SM 43a and the address marks of the first to third AMs 43c, 43f and 43i of the sector 42B as a seek target.

When the mark detector 15 detects the address marks of the first to third AMs 43c, 43f, 43i, the ID portion control circuit 17 can read out the physical addresses of the first to third IDs 43d, 43g and 43j. Accordingly, the FMC 11 sets its count value to the values N2a, N2b and N2c in response to the synchronizing signals SETa, SETb and SETc from the ID portion control circuit 17, respectively.

According to this embodiment, the FMC 11 is also immediately synchronized with the position of the drive head 14 in the sector 42B as a seek target. As a result, the data portion processing circuit 16 enters an operation mode in response to the count value N of the synchronized FMC 11 in the same manner as described above, and can surely read out each data of the data portion 42b.

Next, sequential access to the sector 42C (track T+6; sector number J) in the zone 41a and the sector 42D (track T+7; sector number 0) of the adjacent zone 41b will be described.

Even when the drive head 14 sequentially reads out sector data over two zones 41a and 41b, the frequency of the basic clock signal CLK1 output from the PLL synthesizer 12 is maintained at the frequency for the previous zone 41a until the PLL synthesizer 12 is locked to a new state. Accordingly, when the drive head 14 is shifted to the next zone 41b, the count value of the FMC 11 is not synchronized with a new position of the drive head 14.

At this time, the mark detector 15 is in the first search mode, and detects the sector mark of the SM 43a and the address marks of the first to third AMs 43c, 43f and 43i in synchronism with the read clock signal CLK2. When the mark detector 15 detects the sector mark, the FMC 11 sets its count value to a value N1 in response to the SM detection signal SMD from the mark detector 15. Furthermore, when the mark detector 15 detects the address marks, the ID portion control circuit 17 is allowed to read out the physical addresses of the first to third IDs 43d, 43g and 43j. Accordingly, the FMC 11 sets its count value N to the values N2a, N2b and N2c in response to the synchronizing signals SETa, SETb and SETc from the ID portion control circuit 17, respectively.

According to this embodiment, even when the drive head 14 is shifted over several zones 41 to read the data of a zone that the drive head arrives at, the count value of the FMC 11 is immediately reset to be in synchronism with the position of the drive head 14. As a result, the data portion processing circuit 16 is set to an operation mode based on the count value N of the synchronized FMC 11, so that it can surely read out each data of the data portion 42b.

The same as described above is satisfied for a case where data are written into a desired sector 42 of a zone 41. That is, since the count value of the FMC 11 is matched with the position of the drive head 14 at all times, the drive head 14 can surely seek the desired sector 42 to write the write-in data WD into the data portion 42b through the data portion processing circuit 16.

A case where the frequency of the basic clock signal CLK1 from the PLL synthesizer 12 is locked to another frequency corresponding to the zone 41b before the drive head 14 passes through the sector 42C in the zone 41a in order to process the sector 42D in the zone 41b will be described.

The current position of the drive head 14 and the count value N of the FMC 11 are synchronized with each other before the drive head 14 reaches the SM 43a at the head of the sector 42C (sector number J) in the zone 41a. However, when the drive head 14 passes over the sector 42C, a slippage occurs between the current position of the drive head 14 and the count value N of the FMC 11. Consequently, the first to third IDs 43d, 43g and 43j of the sector 42C cannot be read.

However, the mark detector 15 is in the first search mode, and can detect the sector mark of the SM 43a and the address marks of the first to third AMs 43c, 43f and 43i in the sector 42D (sector number 0) of the adjacent zone 41b. Subsequently, the same operations as described above are carried out, and each data of the data portion 42b can be read out.

According to this embodiment, the mark detector 15 in the first search mode can detect the sector mark of the SM 43a and the address marks of the first to third AMs 43c, 43f and 43i at all times, irrespective of the count value N of the FMC 11. When the mark detector 15 detects the sector mark of the SM 43a, the mark detector 15 outputs the SM detection signal SMD to the FMC 11. The FMC 11 sets its count value N to the value N1 which is synchronized with the position of the drive head 14, in response to the SM detection signal SMD.

When the mark detector 15 detects the address marks of the first to third AMs 43c, 43f and 43i, the mark detector 15 outputs the AM detection signal AMD to the ID portion control circuit 17. The ID portion control circuit 17 reads out the physical addresses of the first to third IDs 43d, 43g and 43j in response to the AM detection signal AMD. When the reading of each physical address is successfully completed, the ID portion control circuit 17 outputs the synchronizing signals SETa, SETb and SETc to the FMC 11, respectively. The FMC 11 sets its count value to the values N2a, N2b and N2c which are synchronized with the position of the drive head 14, in response to the synchronizing signals SETa, SETb and SETc, respectively.

Accordingly, the count value of the FMC 11 is in synchronism with the position of the drive head 14 at all times, so that each mark and each physical address of each sector 42 can be read out at all times. Therefore, the drive head 14 can surely seek a target sector without losing sight of the seek target, and the data portion processing circuit 16 can surely read out each data of the data portion 42b of the target sector. According to the present invention, it is unnecessary to temporarily stop the format controller for resynchronization of the FMC 11, unlike the conventional art. This permits the load of the MPU 13 controlling the whole optical disc device to be reduced.

Since this invention allows correct seeking to a target sector, the data portion processing circuit 16 can surely write data into the data portion 42b of the target sector in the same manner as used in the data reading operation.

According to this embodiment, the sector mark of the sector 42 at the head of each zone 41 can be surely read out. This means that the whole recording area of a disc medium can be effectively used.

The optical disc device according to this embodiment has the second search mode as well as the first search mode. The second search mode is used when the count value N of the FMC 11 and the position of the drive head 14 are synchronized with each other, for example, when the drive head 14 executes no seek operation for the sector, or when the sector at the head of the zone 41 is not processed. In such case, as shown in a timing chart of FIG. 7, the mark detector 15 is actuated only during a prescribed time period (Na≦N≦Nb) based on the count value N of the FMC 11. With this operation, power consumption of the optical disc device can be reduced.

Second Embodiment

Figure 8:
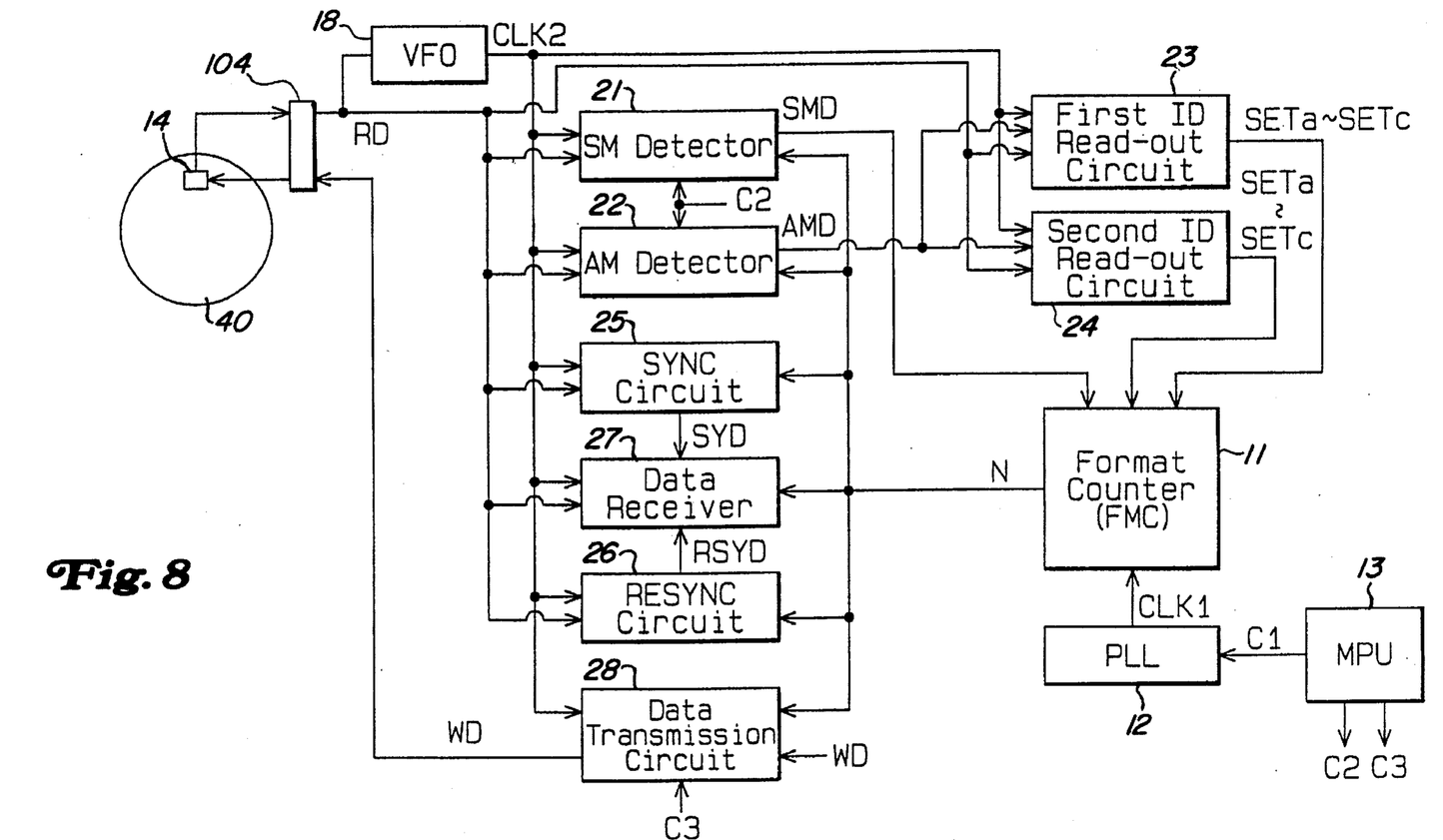
FIG. 8 is a circuit diagram showing a format controller according to a second embodiment of the present invention.

A second embodiment according to the present invention will now be described with reference to FIG. 8. FIG. 8 shows a circuit construction of a format controller. The same elements as those of the format controller shown in FIG. 5 are represented by the same reference numerals to avoid the repetition of the detailed description.

A sector mark detector (hereinafter referred to as SM detector) 21 is supplied with a search mode signal C2 from the MPU 13, and also supplied with a count value N from the FMC 11. In response to the search mode signal C2, the SM detector 21 enters a first search mode, in which the SM detector 21 receives all read data RD that the drive head 14 read out from the sectors of a optical disc 40 in synchronism with the read clock signal CLK2 from the VFO 18, irrespective of the count value of the FMC 11.

When no search mode signal C2 is output from the MPU 13, the SM detector 21 is in the second search mode, in which the SM detector 21 is actuated when the count value N of the FMC 11 is between values Naa and Nab (Naa≦N≦Nab). In other words, in the second search mode, the SM detector 21 receives a part of the read data RD, which are read by the drive head 14 in synchronism with the read clock signal CLK2 only during a prescribed operation timing as a detection window. The values Naa and Nab are set such that the sector mark of the SM 43a of the sector 42 can be surely detected by the SM detector 21 in the range defined by the two values (Naa≦N≦Nab) as long as the count value N of the FMC 11 and the position of the drive head 14 are in synchronism with each other.

Accordingly, the SM detector 21 detects the sector mark at all times in the first search mode, and detects the sector mark only during a predetermined period of time in the second search mode. The SM detector 21 determines whether the read data RD is a sector mark. If the read data RD is judged to be the sector mark, the SM detector 21 outputs an SM detection signal SMD to the FMC 11.

An address mark detector (hereinafter referred to as AM detector) 22 is supplied with a search mode signal C2 from the MPU 13, and also supplied with a count value N from the FMC 11. The AM detector 22 enters the first search mode in response to the search mode signal C2. In the first search mode, the AM detector 22 receives all read data RD, which the drive head 14 reads out from the sectors of the optical disc 40 in synchronism with the read clock signal CLK2, at all times.

When no search mode signal C2 is output from the MPU 13, the AM detector 22 is in the second search mode, in which the AM detector 22 is actuated when the count value N of the FMC 11 is between values Nba and Nbb (Nba≦N≦Nbb). Specifically, in the second search mode, the AM detector 22 receives a part of the read data RD, which the drive head 14 reads in synchronism with the read clock signal CLK2, only during a prescribed operation period of time as a detection window. The values Nba and Nbb are set such that the respective address marks of the first to third AMs 43c, 43f and 43i of the sector 42 can be surely detected by the AM detector 22 in the range defined by the two values (Nba≦N≦Nbb) as long as the count value N of the FMC 11 and the position of the drive head 14 are in synchronism with each other.

Consequently, the AM detector 22 detects each address mark at all times in the first search mode, and detects each address mark only during a predetermined time period in the second search mode. The AM detector 22 determines whether each received data correspond to an address mark. If the data are judged to be the address mark, the AM detector 22 outputs an AM detection signal AMD to a first and second ID read circuits 23 and 24.

Each of the first and second ID read circuits 23 and 24 corresponds to the ID portion control circuit 17 shown in FIG. 5. When supplied with an AM detection signal AMD, each of the first and second ID read circuits 23 and 24 enters an operation mode for a predetermined period of time. The ID read circuits 23 and 24 in the operation mode read out subsequent data, i.e., physical addresses of the IDs 43d, 43g and 43j in synchronism with the read clock signal CLK2. The ID read circuits 23 and 24 check whether the read data are the physical addresses of the IDs 43d, 43g and 43j. If the data are the physical addresses of the IDs 43d, 43g and 43j, the first and second ID read circuits 23 and 24 judge the success in data reading and output synchronizing signals SETa, SETb and SETc to the FMC 11.

The first and second ID read circuits 23 and 24 are alternately operated. For example, the first ID read circuit 23 reads the physical address of each of the IDs 43d, 43g and 43j in response to the AM detection signal AMD based on each address mark, and outputs the synchronizing signals SETa, SETb and SETc. When the first ID read circuit 23 reads out each physical address, a new AM detection signal AMD based on each new address mark may occur for some reason. Even at this time, the second ID read circuit 24 reads the physical addresses of the IDs 43d, 43g and 43j in response to the new AM detection signal AMD. Every time a reading operation is successfully completed, the second ID read circuit 24 outputs the synchronizing signals SETa, SETb and SETc to the FMC 11, respectively. The synchronizing signal detection circuit (hereinafter referred to as SYNC circuit) 25 is supplied with the count value N from the FMC 11. The SYNC circuit 25 enters an operation mode only when the count value is between values Nia and Nja (Nia≦N≦Nja). That is, the SYNC circuit 25 receives a part of the read data RD in synchronism with the read clock signal CLK2 only during a predetermined period of time as a detection window. The values Nia and Nja are set such that synchronizing data of the SYNC 43o in the data portion 42b of a sector 42 are surely read by the SYNC circuit 25 in the range defined by the two values (Nia≦N≦Nja) as long as the count value N of the FMC 11 and the position of the drive head 14 are in synchronism with each other.

The SYNC circuit 25 checks whether the received data is the synchronizing data of the SYNC 43o. If the received data are judged to be the synchronizing data, the SYNC circuit 25 outputs a synchronizing detection signal SYD indicating the success in the read operation.

A resynchronizing signal detection circuit (hereinafter referred to as RESYNC circuit) 26 is supplied with the count value N of the FMC 11. The RESYNC circuit 26 enters an operation mode only when the count value N is between values Nib and Njb (Nib≦N≦Njb). That is, the RESYNC circuit 26 receives a part of the read data RD in synchronism with the read clock signal CLK2 for only a predetermined period of time as a detection window. The values Nib and Njb are set such that resynchronizing data of the RESYNC 43d in the data portion 42b of a sector 42 are surely read by the RESYNC circuit 26 in the range defined by the two values (Nib≦N≦Njb) as long as the count value N of the FMC 11 and the position of the drive head 14 are in synchronism with each other.

The RESYNC circuit 26 checks whether the received data are the synchronizing data of the RESYNC 43d. If the data are judged to be the synchronizing data, the RESYNC circuit 26 outputs a resynchronizing detection signal RSYD indicating the success in the reading operation.

A data receiver 27 corresponds to the data portion processing circuit 16 shown in FIG. 5, and is supplied with the synchronizing detection signal SYD, the resynchronizing detection signal RSYD and the count value N of the FMC 11. The data receiver 27 enters an operation mode only when the count value N is between values Nic and Njc (Nic≦N≦Njc). Specifically, the data receiver 27 receives the data read by the drive head 14, i.e., data of the user data portion 44a, in synchronism with the synchronizing detection signal SYD, the resynchronizing detection signal RSYD and the read clock signal CLK2, for only the predetermined period of time as a detection window. The values Nic and Njc are set such that data of the user data portions 44a of a sector 42 are surely read by the data receiver 27 in the range defined by the two values (Nic≦N≦Njc) as long as the count value N of the FMC 11 and the position of the drive head 14 are in synchronism with each other.

A data transmission circuit 28 enters a write operation mode in response to the write mode signal C3 from the MPU 13. When the count value N is between the values Nic and Njc (Nic≦N≦Njc), the data transmission circuit 28 in the write mode outputs write-in data WD, supplied from an external circuit (not shown), to the drive head 14.

In the format controller, when a search mode signal C2 is output from the MPU 13, each of the SM and AM detectors 21 and 22 is set to the first search mode. Then, the PLL synthesizer 12 generates the basic clock signal CLK1 having the frequency in accordance with the zone 41 sought by the drive head 14. The FMC 11 counts the number of pulses of the basic clock signal CLK1, and outputs the count value N to the detectors 21 and 22 and circuits 25, 26, 27 and 28.

The SM detector 21 in the first search mode receives all the read data RD from the drive head 14 in synchronism with the read clock signal CLK2 to detect the sector mark of the SM 43a. Likewise, the AM detector 22 in the first search mode receives the read data RD to detect the address mark of the first to third AMs 43c, 43f and 43i. The SM detector 21 outputs an SM detection signal SMD to the FMC 11 as soon as the sector mark of the SM 43a of one sector 42 is detected. The FMC 11 sets the count value N to a value N1 in response to the SM detection signal SMD to start its count operation from the set value N1.

Subsequently, as soon as the AM detector 22 detects the address mark of the first AM 43c of its sector 42, the AM detector 22 outputs an AM detection signal AMD to the first ID read-out circuit 23. The first ID read circuit 23 is set to an operation mode only for a predetermined period of time, in response to the AM detection signal AMD. The first ID read circuit 23 in the operation mode reads the physical address of the first ID 43d as subsequent data, in synchronism with the read clock signal CLK2. When the reading of physical address is successfully completed, the first ID read circuit 23 outputs a synchronizing signal SETa to the FMC 11 immediately. The FMC 11 sets the count value N to N2a in response to the first synchronizing signal SETa, and starts its count operation from the value N2a.

Subsequently, when the address mark of the second AM 43f of its sector 42 is detected, the AM detector 22 immediately outputs an AM detection signal AMD to the first ID read circuit 23 in the same manner as described above. In response to the AM detection signal AMD, the first ID read circuit 23 is set to an operation mode for a predetermined period of time to read the physical address of the subsequent second ID 43g in synchronism with the read clock signal CLK2. When the reading of the physical address is successfully completed, the first ID read circuit 23 outputs a second synchronizing signal SETb to the FMC 11 immediately. The FMC 11 sets its count value N to a value N2b in response to the synchronizing signal SETb, and starts its count operation from the value N2b.

Further, when the address mark of the third AM 43i is detected, the AM detector 22 immediately outputs an AM detection signal to the first ID read circuit 23. The first ID read circuit 23 is set to an operation mode for only a predetermined time period in response to the AM detection signal AMD. The first ID read circuit 23 reads the physical address of the subsequent third ID 43j in synchronism with the read clock signal CLK2. When the reading of the physical address is successfully completed, the first ID read circuit 23 immediately outputs a third synchronizing signal SETc to the FMC 11. In response to the synchronizing signal SETc, the FMC 11 sets its count value N to a value N2c, and starts its count operation from the set value N2b. As described above, the count value of the FMC 11 is synchronized every time the sector mark and each physical address are read.

When the count value N of the synchronized FMC 11 reaches a value Nia, the SYNC circuit 25 enters an operation mode, and detects subsequent synchronizing data in synchronism with the read clock signal CLK2. Upon detection of the synchronizing data, the SYNC circuit 25 outputs the synchronizing detection signal SYD to the data receiver 27.

Furthermore, when the count value N of the synchronized FMC 11 reaches a value Nib, the RESYNC circuit 26 enters an operation mode and detects subsequent resynchronizing data in synchronism with the read clock signal CLK2. Upon detection of the resynchronizing data, the RESYNC circuit 25 outputs a resynchronizing detection signal RSYD to the data receiver 27.

When the count value N reaches a value Nic and when either synchronizing detection signal SYD or resynchronizing detection signal RSYD is input to the data receiver 27, the data receiver 27 can surely read data of each data portion 42b in synchronism with the read clock signal CLK2. At that time, the SYNC circuit 25, the RESYNC circuit 26 and the data receiver 27 enter the respective operation modes according to the count value N of the synchronized FMC 11, so that the synchronizing data, the resynchronizing data and each data of the data portion 42b can be surely read.

In the zone 41a shown in FIG. 1, when the drive head 14 shifts from the sector 42A (track T+3; sector number K) to the sector 42B (track T+5; sector number L), the mark detector 15 according to the first embodiment may not detect the address mark of the second AM 43f. However, in this embodiment, the first and second ID read-out circuits 23 and 24 are provided to output the synchronizing signals SETa, SETb and SETc to the FMC 11 therefrom. Therefore, the FMC 11 sets its count value N to the values N2a, N2b and N2c in response to the synchronizing signals SETa, SETb and SETc, respectively. This allows the data receiver 27 to enter the operation mode based on the count value N of the synchronized FMC 11, thereby surely reading each data of the data portion 42b.

Even when sequential access to plural sectors is performed over adjacent zones, for example, from the sector 42C (track T+6; sector number J) in the zone 41a to the sector 42D (sector 0) in the next zone 41b, this second embodiment has the same effect as the first embodiment. That is, the FMC 11 is subjected to the synchronization like the first embodiment, so that the data receiver 27 can be set to an operation mode in accordance with the count value N of the synchronized FMC 11.

Furthermore, even when data is written in a prescribed sector 42 of a prescribed zone 41, the FMC 11 of this embodiment is synchronized with the position of the drive head 14 at all times, like the first embodiment. Therefore, the data transmission circuit 28 can surely write the write data WD into the data portion 42b of a prescribed sector 42.

According to this embodiment, the sector mark, the address mark and the physical address can be surely detected in the first search mode. Accordingly, like the first embodiment, the FMC 11 is synchronized with the position of the drive head 14 at all times. Therefore, each mark and each physical address of each sector 42 can be read at all times, so that the drive head 14 is allowed to seek a target sector 42 without losing sight of the target sector, and the data can be surely taken in from the sector by the data receiver 27. Accordingly, unlike the conventional format controller, it is unnecessary to temporarily cease the format controller for the purpose of resynchronization of the FMC 11. This reduces the load of the MPU 13 which controls the whole system of the optical disc device.

Although only two embodiments of the present invention have been described herein, it should be apparent to those skilled in the art that the present invention may be embodied in many other specific forms without departing from the spirit or scope of the invention. Particularly, it should be understood that the present invention may be embodied in the following manner.

Figure 9:
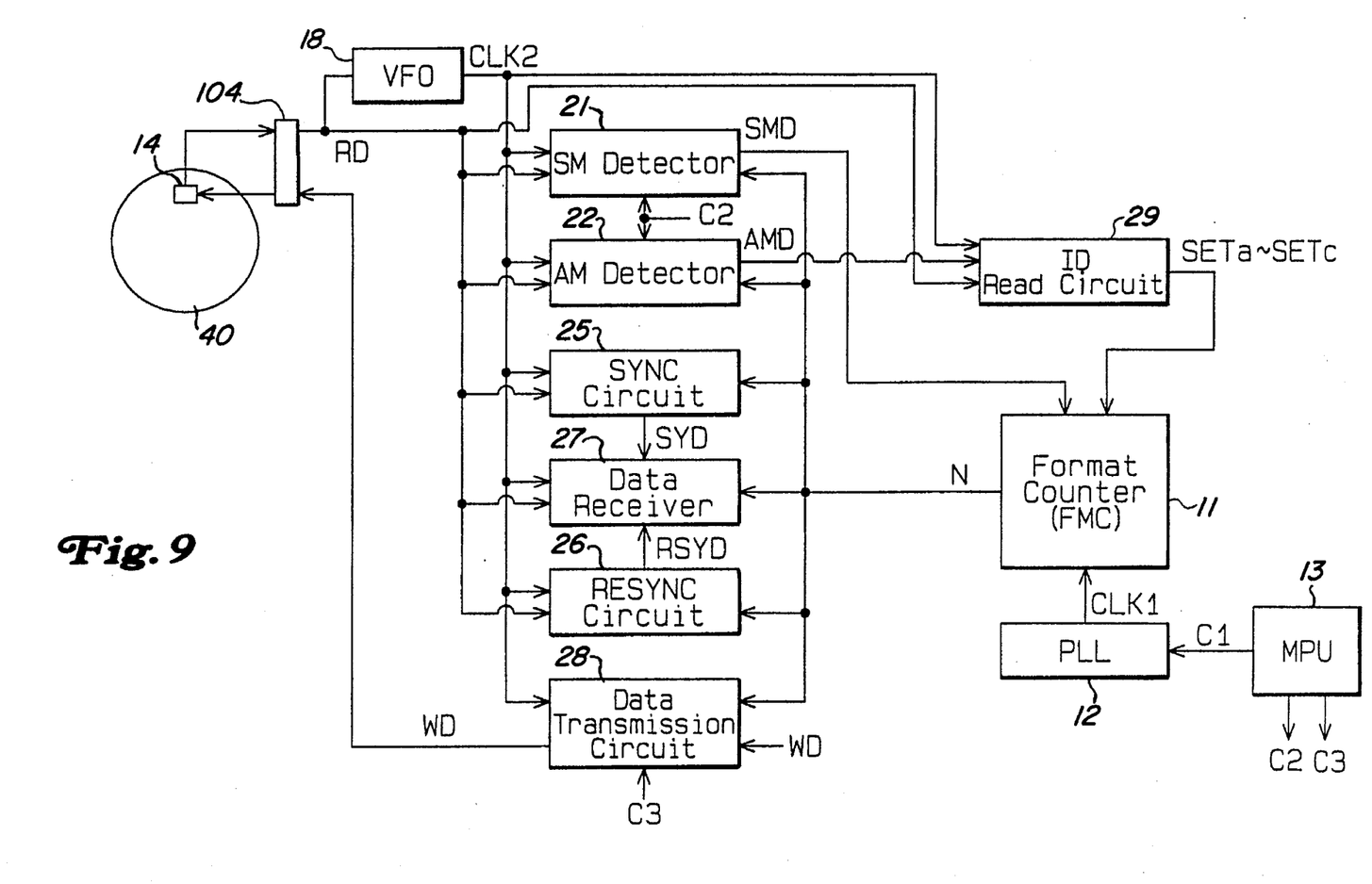
FIG. 9 is a circuit diagram showing a modification of the format controller of the second embodiment.

FIG. 9 shows a modification of the second embodiment. The circuits (21,22,25,26,27,28) for detecting sector and address marks are identical to those of the second embodiment. However, a circuit for detecting the physical addresses of the first to third IDs 43d, 43g and 43j of each sector is formed by a single ID read circuit 29. This construction enables the whole format controller to be designed in more compact size than that of the second embodiment, and reduce the number of wirings for control signals.

In the second embodiment, the SM detector 21 and the AM detector 22 are simultaneously set to the first search mode so that sector and address marks can be detected at all times. However, the AM detector 22 may be set to the second search mode when the SM detector 21 is set to the first search mode. In this case, the count value N of the FMC 11 and the position of the drive head are also synchronized with each other. Furthermore, when the SM detector 21 is set to the second search mode, the AM detector 22 may be set to the first search mode. In this case, the count value N of the FMC 11 and the position of the drive head are also synchronized with each other.

This invention may be applied to a format control device for an optical device exclusively used for data reading operation. Furthermore, this invention may be also applied to a format control device for a magnetic disc device using a magnetic disc as a recording medium.

This invention may be applied to disc formats other than ZCAV format, for example, a format in which the head positions of the respective sectors are aligned with each other in a radial direction extending from the disc center. In this case, the optical disc device is of a constant angular velocity type, and the count value N of the FMC 11 and the position of the drive head are synchronized with each other.

Therefore, the present examples and embodiments are to be considered as illustrative and not restrictive and the invention is not to be limited to the details given herein, but may be modified within the scope of the appended claims.

What is claimed is:

1. A data access controller for a disc device for accessing data recorded on a disc by a drive head, said disc having a plurality of sectors, each sector having areas in which a sector mark, an address mark, a physical address and user data are stored, said data access controller comprising:

a control unit for outputting a plurality of control signals containing a mode switching signal to control the whole system of said disc device;

a mark detector for detecting a sector mark and address mark in read data from a target sector by the drive head, and for outputting a first detection signal indicating detection of sector mark and a second detection signal indicating detection of address mark, said mark detector enters a first search mode, in which all data bits of the target sector are detected, in response to the mode switching signal from said control unit;

a physical address read circuit for reading physical address data in said read data in response to the second detection signal, and for outputting a synchronizing signal;

a format counter for receiving a basic clock signal to count the number of pulses of the clock signal and outputting the count value, said format counter resetting the count value to a prescribed value in accordance with the first detection signal and the synchronizing signal in order to synchronize the count value with the position of the drive head over the target sector; and a circuit for referring to the count value from said format counter to read user data in the read data.

2. The data access controller according to claim 1, wherein said mark detector is supplied with the count value from said format counter, and wherein in response to the mode switching signal from said control unit, said mark detector enters a second search mode in which a part of data bits of the target sector is detected during a period of time when the count value is within a predetermined numeric value range.

3. The data access controller according to claim 1, wherein said mark detector includes:

a sector mark detection circuit for detecting the sector mark in the read data from the target sector and for outputting the first detection signal indicating the detection of sector mark; and an address mark detection circuit for detecting the address mark in the read data from the target sector and for outputting the second detection signal indicating the detection of the address mark.

4. The data access controller according to claim 3, wherein said physical address read circuit comprises first and second read circuits provided in parallel between said address mark detector and said format counter.

5. The data access controller according to claim 1 further comprising a circuit for transmitting write data to the drive head, based on the count value of said format counter.

6. The data access controller according to claim 1, wherein said data access controller is a zone constant angular velocity type of format controller compatible with a disc of a logical track format.

7. The data access controller according to claim 6 further comprising a PLL frequency synthesizer for supplying said format counter with the basic clock signal in accordance with the control signal from said control unit, wherein the frequency of the basic clock signal is variable in accordance with a zone on the disc sought by the drive head.

8. A disc device comprising:

a first driver for rotating a disc as a recording medium, said disc being of a logical track format and having a plurality of sectors, each sector having areas in which a sector mark, an address mark, a physical address and user data are stored;

a second driver for moving a drive head over the disc;

a first control circuit for controlling said first driver;

a second control circuit for controlling said second driver;

a third control circuit for controlling the drive head for data reading operation; and a drive controller for outputting control signals to said first, second and third control circuits, said drive controller including a zone constant angular velocity type data access controller, wherein the data access controller includes:

a control unit for outputting a plurality of control signals containing a mode switching signal to control the whole system of said disc device;

a mark detector for detecting a sector mark and address mark in read data from a target sector by the drive head, and for outputting a first detection signal indicating detection of sector mark and a second detection signal indicating detection of address mark, said mark detector enters a first search mode, in which all data bits of the target sector are detected, in response to the mode switching signal from said control unit;

a physical address read circuit for reading physical address data in said read data in response to the second detection signal, and for outputting a synchronizing signal;

a format counter for receiving a basic clock signal to count the number of pulses of the clock signal and outputting the count value, said format counter resetting the count value to a prescribed value in accordance with the first detection signal and the synchronizing signal in order to synchronize the count value with the position of the drive head over the target sector; and a circuit for referring to the count value from said format counter to read user data in the read data.

9. The disc device as claimed in claim 8, wherein said recording medium is an optical disc.

10. A data access controller for a disc device for accessing data recorded on a disc by a drive head, said disc having a plurality of sectors, each sector having areas in which a sector mark, an address mark, a physical address and user data are stored, said data access controller comprising:

a control unit for outputting a plurality of control signals containing a mode switching signal to control the whole system of said disc device;

a PLL frequency synthesizer for producing a basic clock signal in response to a control signal from said control unit;

a format counter for receiving the basic clock signal from said PLL frequency synthesizer to count the number of pulses of the clock signal and for outputting the count value;

a mark detector for receiving the count value from said format counter, for detecting the sector mark and the address mark in read data from a target sector by the drive head, and for outputting a first detection signal indicating the detection of sector mark and a second detection signal indicating the detection of address mark;

said mark detector entering one of the first and second search modes in response to the mode switching signal from said control unit, wherein in the first search mode, said mark detector detects all data bits of the target sector irrespective of the count value of said format counter, wherein in the second search mode, said mark detector detects a part of the data bits of the target sector during a period of time when the count value of said format counter is within a first predetermined numerical value range;

a physical address read circuit for reading the physical address data in the read data in response to the second detection signal, and for outputting synchronizing signals; and a circuit for receiving the count value from said format counter, and for detecting a part of the data bits of the target sector during a period of time when the count value is within a second predetermined numerical value range, thereby reading user data in the read data, wherein said format counter sets the count value to a predetermined value in response to the first detection signal and the synchronizing signal in order to synchronize the count value with the position of the drive head over the target sector.

11. The data access controller according to claim 10, wherein said mark detector includes:

a sector mark detection circuit for detecting the sector mark in the read data from the target sector and for outputting a first detection signal indicating the detection of sector mark; and an address mark detection circuit for detecting the address mark in the read data from the target sector and for outputting a second detection signal indicating the detection of address mark.

12. The data access controller according to claim 11, wherein said physical address read circuit comprises first and second read circuits provided in parallel between said address mark detection circuit and said format counter.

13. The data access controller according to claim 10 further comprising a circuit for transmitting write data to the drive head, based on the count value of said format counter.

14. The data access controller according to claim 10, wherein said data access controller is a zone constant angular velocity type of format controller compatible with a disc of a logical track format.

15. The data access controller according to claim 10, wherein the frequency of the basic clock signal is variable in accordance with a zone on the disc sought by the drive head.

16. A method of reading data recorded on a disc having a plurality of sectors, each sector having areas in which a sector mark, an address mark, a physical address and user data are stored, said method comprising the steps of:

using a disc device having a control unit for generating a mode switching signal, a drive head, a mark detector for detecting at least one of the sector mark and the address mark from read data from a target sector by the drive head, and a format counter for setting the count value in accordance with a detection result of said mark detector;

switching an operation mode of said mark detector between a first search mode and a second search mode in accordance with the mode switching signal, wherein in the first search mode said mark detector detects all data bits of the target sector irrespective of the count value of said format counter, wherein in the second search mode said mark detector detects a part of the data bits of the target sector during a period of time when the count value of said format counter is within a predetermined numerical value range; and detecting at least one of the sector mark and the address mark, based on data detected by said mark detector.

17. The method according to claim 16, wherein the recording format of the disc is a logical track format.

* * * * *